US012802602B2

(12) United States Patent
Kim et al.

(10) Patent No.: US 12,802,602 B2
(45) Date of Patent: Nov. 17, 2026

(54) DISPLAY DEVICE AND METHOD OF DRIVING THE DISPLAY DEVICE

(71) Applicant: Samsung Display Co., Ltd., Yongin-Si (KR)

(72) Inventors: Jiyoun Kim, Pohang-si (KR); Hongsoo Kim, Hwaseong-si (KR); Myungwoo Lee, Cheonan-si (KR); Junheyung Jung, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 138 days.

(21) Appl. No.: 17/573,314

(22) Filed: Jan. 11, 2022

(65) Prior Publication Data

US 2022/0351660 A1 Nov. 3, 2022

(30) Foreign Application Priority Data

Apr. 29, 2021 (KR) ........................ 10-2021-0055685

(51) Int. Cl.
*G09G 3/20* (2006.01)

(52) U.S. Cl.
CPC ......... *G09G 3/20* (2013.01); *G09G 2320/103* (2013.01); *G09G 2330/021* (2013.01); *G09G 2340/0435* (2013.01)

(58) Field of Classification Search
None
See application file for complete search history.

(56) References Cited

U.S. PATENT DOCUMENTS

2002/0043991 A1 4/2002 Nishitoba
2006/0087502 A1* 4/2006 Karidis ................. G06F 1/3218 345/211
2006/0103643 A1* 5/2006 Mathew ............... G09G 3/3466 359/290
2009/0237345 A1 9/2009 Kamada et al.
2009/0237391 A1* 9/2009 Yanagi ..................... G09G 5/18 345/99
2009/0251445 A1* 10/2009 Ito ........................ G09G 3/3648 345/204

(Continued)

FOREIGN PATENT DOCUMENTS

CN 101546542 A 9/2009
CN 103680382 A 3/2014
CN 112309304 A 2/2021

*Primary Examiner* — Dorothy Harris

(74) *Attorney, Agent, or Firm* — Innovation Counsel LLP

(57) ABSTRACT

A display device includes a display panel having a display region and a panel driver that drives the display panel based on input image data. The panel driver calculates a normal driving frequency for driving a first partial region and a low frequency for driving a second partial region when the input image data represents a moving image for the first partial region and represents a still image for the second partial region, calculates a power consumption required to drive the display panel when an entire section of the second partial region is driven at a same low frequency, calculates a power consumption required to drive the display panel when a partial section of the second partial region and a remaining section of the second partial region are driven at mutually different frequencies, and determines a driving frequency of the second partial region by comparing the power consumption.

20 Claims, 13 Drawing Sheets

(56) References Cited

U.S. PATENT DOCUMENTS

| | | | | |
|---|---|---|---|---|
| 2014/0085276 | A1* | 3/2014 | Jang | G09G 3/2007 345/204 |
| 2014/0198138 | A1* | 7/2014 | Nambi | G09G 3/36 345/87 |
| 2014/0292741 | A1* | 10/2014 | Yamazaki | H01L 27/1225 345/212 |
| 2015/0145901 | A1* | 5/2015 | Lee | G09G 3/3614 345/96 |
| 2015/0146097 | A1* | 5/2015 | Izumi | H04N 21/440218 348/447 |
| 2015/0358018 | A1* | 12/2015 | Kim | G09G 3/20 345/208 |
| 2016/0042708 | A1* | 2/2016 | Wang | G09G 3/3611 345/214 |
| 2016/0111055 | A1* | 4/2016 | Na | G09G 3/3666 345/94 |
| 2017/0092178 | A1* | 3/2017 | Lee | G09G 3/3266 |
| 2017/0263201 | A1* | 9/2017 | Sato | G09G 3/3648 |
| 2018/0350313 | A1* | 12/2018 | Nambi | G09G 3/36 |
| 2021/0027707 | A1* | 1/2021 | Park | G09G 3/035 |
| 2021/0027715 | A1 | 1/2021 | Kim et al. | |
| 2021/0027720 | A1* | 1/2021 | Park | G09G 3/3266 |
| 2021/0035524 | A1* | 2/2021 | Chun | G06T 3/40 |
| 2021/0103419 | A1* | 4/2021 | Kusunoki | G06F 3/1423 |
| 2021/0304680 | A1* | 9/2021 | Park | G09G 3/3266 |
| 2022/0028314 | A1* | 1/2022 | Kwon | G09G 3/3291 |

* cited by examiner

DISPLAY DEVICE AND METHOD OF DRIVING THE DISPLAY DEVICE

CROSS-REFERENCE TO RELATED APPLICATION

This application claims priority under 35 USC § 119 to Korean Patent Application No. 10-2021-0055685 filed on Apr. 29, 2021 in the Korean Intellectual Property Office (KIPO), the entire disclosure of which is incorporated herein by reference.

BACKGROUND

1. Field

The present disclosure relates generally to a display device and a method of driving the display device. More particularly, the present disclosure relates to a display device capable of employing a multi-frequency driving (MFD) technology and a method of driving the display device.

2. Description of the Related Art

Recently, there has been a demand for reducing power consumption of a display device. In particular, there has been a demand for reducing power consumption of a display device in a mobile device such as a smartphone or a tablet computer. In order to reduce the power consumption of the display device, a low-frequency driving technology for driving or refreshing a display panel at a low frequency that is lower than a normal driving frequency has been developed.

Meanwhile, according to a conventional display device to which the low-frequency driving technology is applied, when a still image is not displayed in an entire region of the display panel, that is, when the still image is displayed only in a partial region of the display panel, the entire region of the display panel is driven at a normal driving frequency. Therefore, in this case, a low-frequency driving may not be performed, and the power consumption may not be reduced.

A multi-frequency driving (MFD) technology for driving partial regions of a display panel at mutually different driving frequencies to reduce power consumption even when a still image is displayed only in a partial region of the display panel has been developed. According to a display device to which the multi-frequency driving technology is applied, a first partial region in which a moving image is displayed may be driven at a normal driving frequency, and a second partial region in which a still image is displayed may be driven at a low frequency that is lower than the normal driving frequency. According to the display device, the second partial region may be driven at the low frequency, so that a power consumption may be reduced. However, there is a limitation in minimizing the power consumption when the entire second partial region in which the still image is displayed is unconditionally driven at one low frequency.

SUMMARY

An object of the present disclosure is to provide a display device capable of minimizing a power consumption when a multi-frequency driving for driving a display region of a display panel at mutually different driving frequencies is performed.

Another object of the present disclosure is to provide a method of driving a display device capable of minimizing a power consumption when a multi-frequency driving for driving a display region of a display panel at mutually different driving frequencies is performed.

According to embodiments, a display device may include a display panel having a display region and a panel driver configured to drive the display panel based on input image data. Here, the panel driver may be configured to calculate a normal driving frequency for driving a first partial region of the display region and a low frequency for driving a second partial region of the display region when the input image data represents a moving image for the first partial region and represents a still image for the second partial region, to calculate a power consumption required to drive the display panel when an entire section of the second partial region is driven at a same low frequency, to calculate a power consumption required to drive the display panel when a partial section of the second partial region and a remaining section of the second partial region are driven at mutually different frequencies, and to determine a driving frequency of the second partial region by comparing the power consumption to each other.

In an embodiment, the first partial region may be a moving image region, and the second partial region may be a still image region. In addition, the still image region may include a first sub-still image region and a second sub-still image region. Further, the panel driver may be configured to calculate a first low frequency for driving the first sub-still image region and to calculate a second low frequency for driving the second sub-still image region.

In an embodiment, the first sub-still image region may be adjacent to the moving image region, and the first low frequency may be higher than the second low frequency.

In an embodiment, the panel driver may be configured to calculate a first power consumption required to drive the display panel when the still image region is driven at the first low frequency, to calculate a second power consumption required to drive the display panel when the first sub-still image region is driven at the normal driving frequency and when the second sub-still image region is driven at the second low frequency, and to determine a driving frequency of the still image region by comparing the first power consumption and the second power consumption to each other.

In an embodiment, the panel driver may be configured to determine the first low frequency as the driving frequency of the still image region when the first power consumption is less than or equal to the second power consumption.

In an embodiment, the panel driver may be configured to determine the normal driving frequency as a driving frequency of the first sub-still image region and determine the second low frequency as a driving frequency of the second sub-still image region when the first power consumption is greater than the second power consumption.

In an embodiment, the panel driver may include a still image detector configured to detect the still image from an image represented by the input image data by analyzing the input image data.

In an embodiment, the panel driver may further include a driving frequency calculator configured to calculate the normal driving frequency for driving the first partial region, which is determined as displaying the moving image by the still image detector, and to calculate the low frequency for driving the second partial region, which is determined as displaying the still image by the still image detector.

In an embodiment, the panel driver may further include a driving frequency decider configured to calculate a first power consumption required to drive the display panel when the entire section of the second partial region is driven at a first low frequency, to calculate a second power consumption required to drive the display panel when the partial section of the second partial region is driven at the normal driving frequency and when the remaining section of the second partial region is driven at a second low frequency that is lower than the first low frequency, and to determine the driving frequency of the second partial region by comparing the first power consumption and the second power consumption to each other.

In an embodiment, the first partial region may be a moving image region, and the second partial region may be a still image region. In addition, the still image region may include a first sub-still image region, a second sub-still image region, and a third sub-still image region. Further, the panel driver may be configured to calculate a first low frequency for driving the first sub-still image region, to calculate a second low frequency for driving the second sub-still image region, and to calculate a third low frequency for driving the third sub-still image region.

In an embodiment, the first sub-still image region may be adjacent to the moving image region, and the second sub-still image region may be adjacent to the first sub-still image region. In addition, the first low frequency may be higher than the second low frequency, and the second low frequency may be higher than the third low frequency.

In an embodiment, the panel driver may be configured to calculate a first power consumption required to drive the display panel when the still image region is driven at the first low frequency, to calculate a second power consumption required to drive the display panel when the first sub-still image region is driven at the normal driving frequency and when the second sub-still image region and the third sub-still image region are driven at the second low frequency, and to determine the normal driving frequency as a driving frequency of the first sub-still image region and determine the second low frequency as a driving frequency of the second sub-still image region and a driving frequency of the third sub-still image region when the first power consumption is greater than the second power consumption.

In an embodiment, the panel driver may be configured to calculate a third power consumption required to drive the display panel when the first sub-still image region and the second sub-still image region are driven at the normal driving frequency and when the third sub-still image region is driven at the third low frequency and to determine the normal driving frequency as the driving frequency of the first sub-still image region and the driving frequency of the second sub-still image region and determine the third low frequency as the driving frequency of the third sub-still image region when the second power consumption is greater than the third power consumption.

According to embodiments, a method of driving a display device which includes a display panel having a display region may include calculating a normal driving frequency for driving a first partial region of the display region when input image data represents a moving image for the first partial region, calculating a low frequency for driving a second partial region of the display region when the input image data represents a still image for the second partial region, calculating a power consumption required to drive the display panel based on the normal driving frequency and the low frequency, and determining a driving frequency of the first partial region and a driving frequency of the second partial region. Here, calculating the power consumption required to drive the display panel may include calculating a power consumption required to drive the display panel when an entire section of the second partial region is driven at a same low frequency and a power consumption required to drive the display panel when a partial section of the second partial region and a remaining section of the second partial region are driven at mutually different frequencies. In addition, determining the driving frequency of the first partial region and the driving frequency of the second partial region may include determining the driving frequency of the second partial region by comparing the power consumption with each other.

In an embodiment, the first partial region may be a moving image region, and the second partial region may be a still image region. In addition, the still image region may include a first sub-still image region and a second sub-still image region. Further, calculating the low frequency for driving the second partial region may include calculating a first low frequency for driving the first sub-still image region and calculating a second low frequency for driving the second sub-still image region.

In an embodiment, the first sub-still image region may be adjacent to the moving image region, and the first low frequency may be higher than the second low frequency.

In an embodiment, calculating the power consumption required to drive the display panel may include calculating a first power consumption required to drive the display panel when the still image region is driven at the first low frequency and calculating a second power consumption required to drive the display panel when the first sub-still image region is driven at the normal driving frequency and when the second sub-still image region is driven at the second low frequency.

In an embodiment, determining the driving frequency of the first partial region and the driving frequency of the second partial region may include determining a driving frequency of the still image region by comparing the first power consumption and the second power consumption with each other.

In an embodiment, determining the driving frequency of the first partial region and the driving frequency of the second partial region may include determining the first low frequency as the driving frequency of the still image region when the first power consumption is less than or equal to the second power consumption.

In an embodiment, determining the driving frequency of the first partial region and the driving frequency of the second partial region may include determining the normal driving frequency as a driving frequency of the first sub-still image region when the first power consumption is greater than the second power consumption and determining the second low frequency as a driving frequency of the second sub-still image region when the first power consumption is greater than the second power consumption.

According to embodiments of the present disclosure, when a multi-frequency driving for driving display regions of a display panel at mutually different driving frequencies is performed, a display device may calculate power consumption required to drive the display panel and may compare the power consumption with each other to drive a partial section of a still image region at a normal driving frequency instead of a low frequency and to drive a remaining section of the still image region except for the partial section at a low frequency that is relatively lower than the low frequency. Therefore, the display device can minimize (or reduce) a power consumed by the display panel when the multi-frequency driving is performed.

DETAILED DESCRIPTION OF THE EMBODIMENTS

Hereinafter, embodiments of the present disclosure will be explained in detail with reference to the accompanying drawings.

Figure 1:
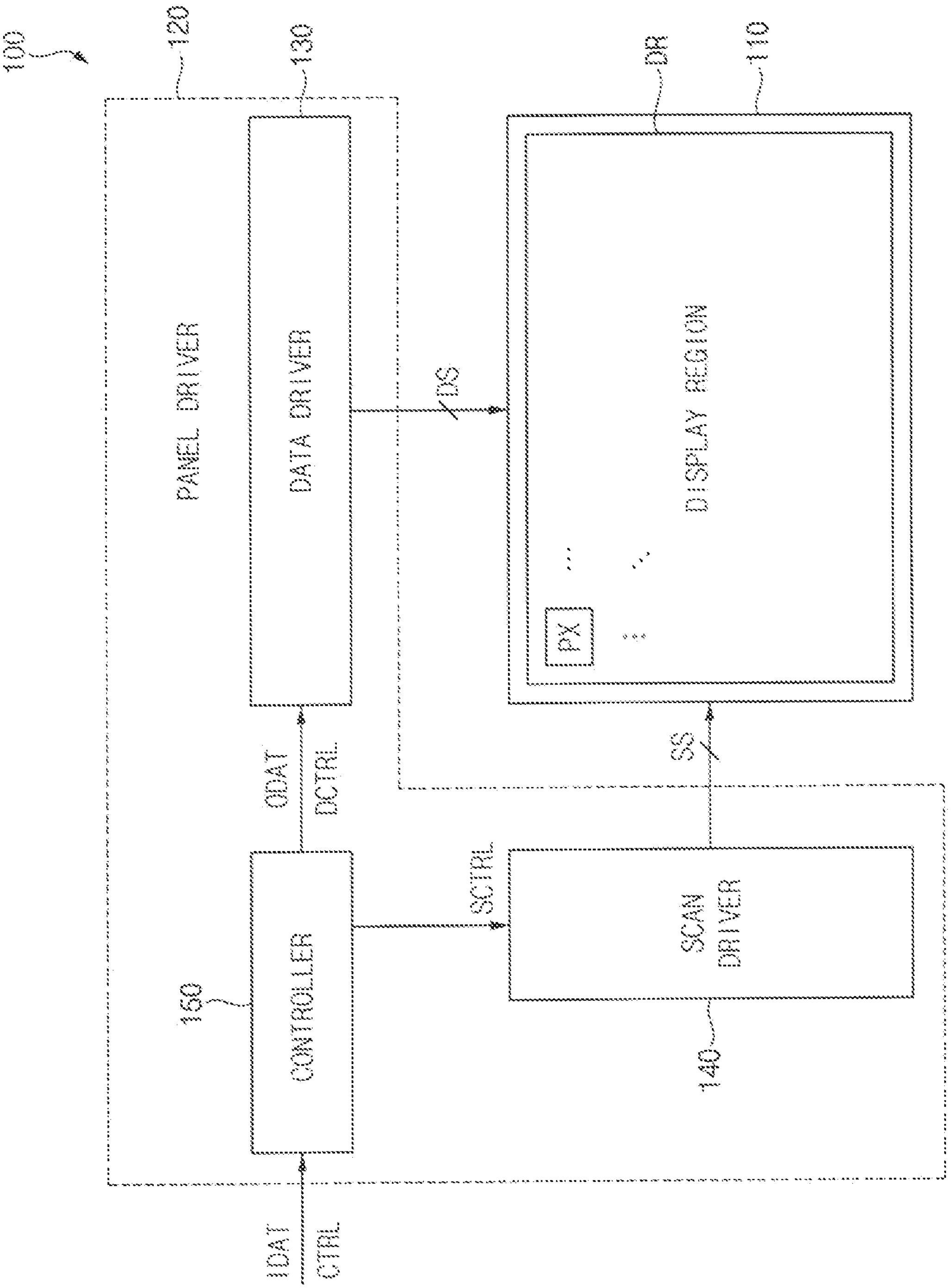
FIG. 1 is a block diagram showing a display device according to embodiments.

FIG. 1 is a block diagram showing a display device according to embodiments.

Referring to FIG. 1, a display device 100 may include a display panel 110 having a display region DR and a panel driver 120 configured to drive the display panel 110 based on input image data IDAT. In an embodiment, the panel driver 120 may include a data driver 130 configured to provide data signals DS to the display panel 110, a scan driver 140 configured to provide scan signals SS to the display panel 110, and a controller 150 configured to control an operation of the display device 100.

The display panel 110 may have a display region DR in which a plurality of pixels PX are formed. In addition, the display panel 110 may include a plurality of data lines, a plurality of scan lines, and a plurality of pixels PX connected to the data lines and the scan lines. In an embodiment, each of the pixels PX may include at least one capacitor, at least two transistors, and an organic light emitting diode (OLED), and the display panel 110 may be an OLED display panel. In another embodiment, the display panel 110 may be a liquid crystal display (LCD) panel, or any other suitable display panel.

The data driver 130 may generate the data signals DS based on output image data ODAT and a data control signal DCTRL received from the controller 150, and provide the data signals DS to the pixels PX through the data lines. In an embodiment, the data control signal DCTRL may include an output data enable signal, a horizontal start signal, and a load signal, but the embodiments are not limited thereto. In an embodiment, the data driver 130 and the controller 150 may be implemented as a single integrated circuit, and the integrated circuit may be referred to as a timing controller-embedded data driver (TED). In another embodiment, the data driver 130 and the controller 150 may be implemented as separate integrated circuits.

The scan driver 140 may generate the scan signals SS based on a scan control signal SCTRL received from the controller 150, and sequentially provide the scan signals SS to the pixels PX in a unit of a pixel rows through the scan lines. In an embodiment, the scan control signal SCTRL may include a scan start signal and a scan clock signal, but the embodiments are not limited thereto. In an embodiment, the scan driver 140 may be integrated or formed in a peripheral part that is adjacent to the display region DR of the display panel 110. In another embodiment, the scan driver 140 may be implemented with one or more integrated circuits.

The controller 150 (e.g., a timing controller (T-CON)) may receive the input image data IDAT and a control signal CTRL from an external host processor (e.g., a graphic processing unit (GPU)), an application processor (AP), or a graphic card. In an embodiment, the control signal CTRL may include a vertical synchronization signal, a horizontal synchronization signal, an input data enable signal, a master clock signal, and the like, but the embodiments are not limited thereto. The controller 150 may generate the output image data ODAT, the data control signal DCTRL, and the scan control signal SCTRL based on the input image data IDAT and the control signal CTRL. The controller 150 may provide the output image data ODAT and the data control signal DCTRL to the data driver 130 to control the data driver 130. The controller 150 may provide the scan control signal SCTRL to the scan driver 140 to control the scan driver 140.

The panel driver 120 of the display device 100 may drive the entire display region DR of the display panel 110 at a normal driving frequency (e.g., about 60 Hz, about 120 Hz, about 144 Hz, etc.) when a moving image is displayed in the entire display region DR of the display panel 110. In addition, the panel driver 120 of the display device 100 may drive the entire display region DR of the display panel 110 at a low frequency (e.g., about 1 Hz, about 2 Hz, about 3 Hz, . . . , about 60 Hz, etc.) that is lower than the normal driving frequency when a still image is displayed in the entire display region DR of the display panel 110. Further, the panel driver 120 of the display device 100 may drive a portion of the display region DR at the low frequency and drive a remaining portion of the display region DR at the normal driving frequency when the still image is displayed only in the portion of the display region DR of the display panel 110. In other words, the panel driver 120 of the display device 100 may perform a multi-frequency driving (MFD) for driving partial regions of the display panel 110 at mutually different driving frequencies. For example, when the still image is displayed only in the portion of the display region DR of the display panel 110, a section of the display region DR that is driven at the normal driving frequency may be a moving image region, and a section of the display region DR that is driven at the low frequency may be a still image region.

Meanwhile, when the multi-frequency driving is performed, the still image region in which the still image is displayed may be divided into a plurality of sub-still image regions. The sub-still image regions may have mutually different driving frequencies according to the input image data IDAT. For example, a driving frequency of a first sub-still image region may be a first low frequency, and a driving frequency of the second sub-still image region may be a second low frequency that is lower than the first low frequency. The still image region may be driven at a highest driving frequency (e.g., the first low frequency) among the driving frequencies of the sub-still image regions. According to the present disclosure, the display device 100 may drive some of the sub-still image regions at the normal driving frequency in order to minimize a power consumed when the multi-frequency driving is performed.

Figure 2:
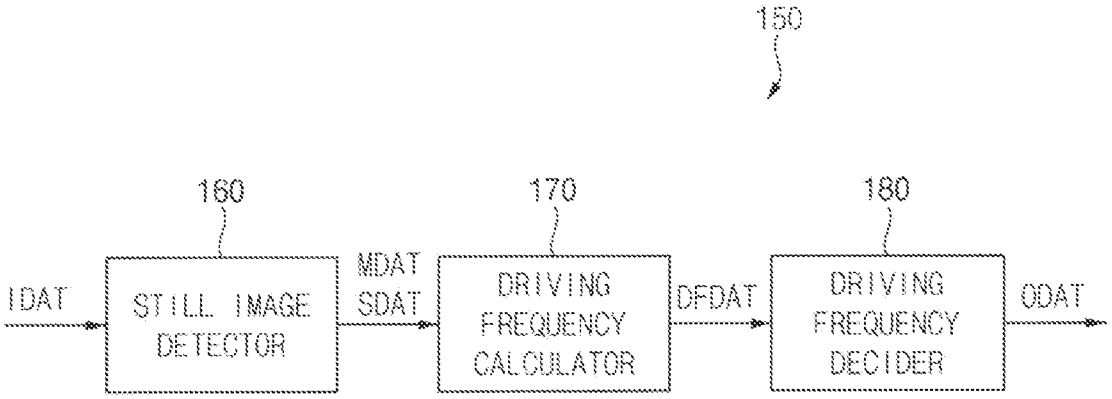
FIG. 2 is a block diagram showing a controller included in the display device of FIG. 1.
Figure 3A:
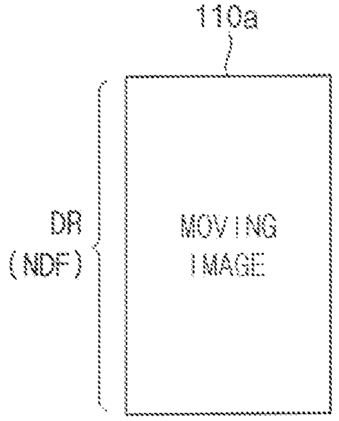
FIGS. 3A, 3B, and 3C are conceptual diagrams showing an example in which an image is displayed on a display panel included in the display device of FIG. 1.
Figure 3B:
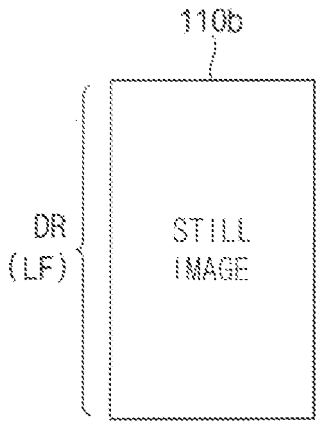
Figure 3C:
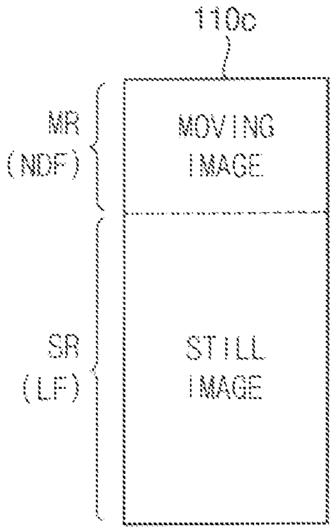
Figure 4:
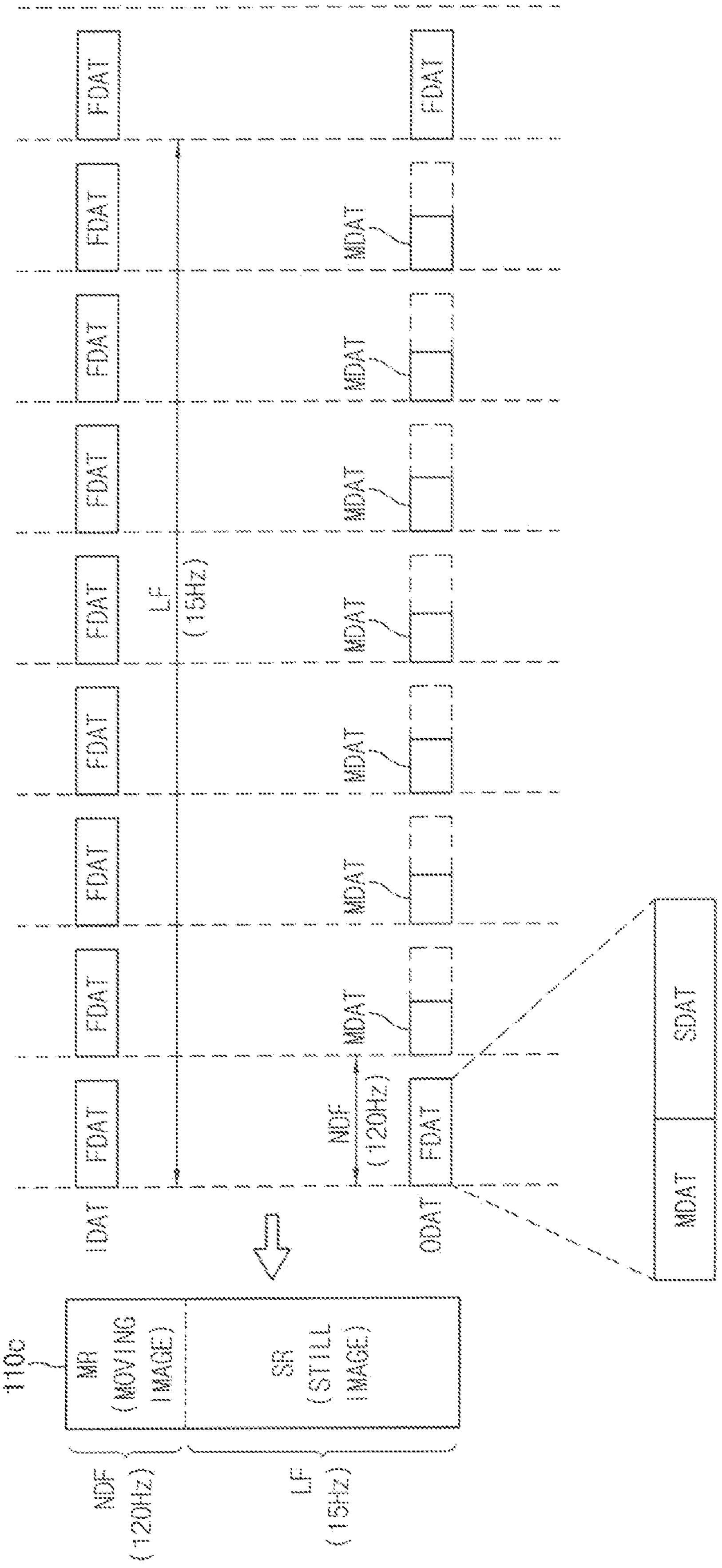
FIG. 4 is a diagram showing a normal-frequency driving operation and a low-frequency driving operation in a case of FIG. 3C.

FIG. 2 is a block diagram showing a controller included in the display device of FIG. 1, FIGS. 3A, 3B, and 3C are conceptual diagrams showing an example in which an image is displayed on a display panel included in the display device of FIG. 1, and FIG. 4 is a diagrams showing a normal-frequency driving operation and a low-frequency driving operation in a case of FIG. 3C.

Referring to FIGS. 1, 2, 3, and 4, the panel driver 120 of the display device 100 may perform the multi-frequency driving for driving display regions of the display panel 110 at mutually different driving frequencies. When the still image is displayed only in the portion of the display region DR of the display panel 110, a section of the display region DR that is driven at a normal driving frequency NDF may be a moving image region MR, and a section of the display region DR that is driven at a low frequency LF may be a still image region SR.

To perform the above operation, the controller 150 may include a still image detector 160, a driving frequency calculator 170, and a driving frequency decider 180. The still image detector 160 may detect the still image from an image represented by the input image data IDAT by analyzing the input image data IDAT based on the input image data IDAT. The still image detector 160 may determine a boundary line for dividing the image represented by the input image data IDAT into a region in which the moving image is displayed and a region in which the still image is displayed. The driving frequency calculator 170 may calculate a driving frequency required to drive the image represented by the input image data IDAT. The driving frequency calculator 170 may calculate a driving frequency for driving the moving image region MR and a driving frequency for driving the still image region SR based on the boundary line. For example, the driving frequency calculator 170 may calculate the normal driving frequency NDF required for driving the moving image region MR, and calculate the low frequency LF required for driving the still image region SR. The driving frequency decider 180 may determine the driving frequencies for driving the moving image region MR and the still image region SR, respectively. The driving frequency decider 180 may determine the normal driving frequency NDF corresponding to the moving image region MR as the driving frequency for the moving image region MR, determine the low frequency LF corresponding to the still image region SR as the driving frequency for the still image region SR.

In an embodiment, as shown in FIG. 3A, when the moving image is displayed in an entire display region DR of a display panel 110*a*, the panel driver 120 may drive the entire display region DR of the display panel 110*a* at the normal driving frequency NDF. The normal driving frequency NDF may be a predetermined refresh rate or driving frequency for the display device 100. For example, the still image detector 160 may compare one of the input image data IDAT in a previous frame with one of the input image data IDAT in a current frame. When the input image data IDAT in the previous frame is different from the input image data IDAT in the current frame, the still image detector 160 may determine that the input image data IDAT represents the moving image for the entire display region DR of the display panel 110*a*. In other words, when the input image data IDAT in the previous frame is different from the input image data IDAT in the current frame, the still image detector 160 may determine that the moving image is displayed in the entire display region DR of the display panel 110*a*. The driving frequency calculator 170 may calculate a driving frequency required to drive the moving image. For example, the driving frequency calculator 170 may calculate the normal driving frequency NDF for driving the entire display region DR of the display panel 110*a* with the moving image. The normal driving frequency NDF may be one of about 60 Hz, about 120 Hz, about 144 Hz, or any other frequency, but the embodiments are not limited thereto. The driving frequency decider 180 may determine the normal driving frequency NDF as a driving frequency for the entire display region DR of the display panel 110*a*, which is determined as displaying the moving image by the still image detector 160. The panel driver 120 may perform a normal-frequency driving operation on the entire display region DR of the display panel 110*a*. In other words, the panel driver 120 may drive the entire display region DR of the display panel 110*a* at the normal driving frequency NDF determined by the driving frequency decider 180.

In an embodiment, as shown in FIG. 3B, when the still image is displayed in an entire display region DR of a display panel 110*b*, the panel driver 120 may drive the entire display region DR of the display panel 110*b* at the low frequency LF that is lower than the normal driving frequency NDF. In an embodiment, the low frequency LF may be any frequency that is lower than the normal driving frequency NDF. For example, the still image detector 160 may compare one of the input image data IDAT in the previous frame with one of the input image data IDAT in the current frame. When the input image data IDAT in the previous frame is identical to the input image data IDAT in the current frame, the still image detector 160 may determine that the input image data IDAT represents the still image for the entire display region DR of the display panel 110*b*. In other words, when the input image data IDAT in the previous frame is identical to the input image data IDAT in the current frame, the still image detector 160 may determine that the still image is displayed in the entire display region DR of the display panel 110*b*. The driving frequency calculator 170 may calculate a driving frequency required to drive the still image. For example, the driving frequency calculator 170 may calculate the low frequency LF for driving the entire display region DR of the display panel 110*b* with the still image. When the normal driving frequency NDF is about 120 Hz, the low frequency LF may be about 1 Hz, about 2 Hz, about 3 Hz, . . . , may be about 60 Hz, but the embodiments are not limited thereto. The driving frequency decider 180 may determine the low frequency LF as a driving frequency for the entire display region DR of the display panel 110*b*, which is determined as displaying the still image by the still image detector 160. The panel driver 120 may perform a low-frequency driving operation on the entire display region DR of the display panel 110*b*. In other words, the panel driver 120 may drive the entire display region DR of the display panel 110*b* at the low frequency LF determined by the driving frequency decider 180.

In an embodiment, as shown in FIG. 3C, when the moving image is displayed in a moving image region MR of a display region DR of a display panel 110*c*, and the still image is displayed in a still image region SR of the display region DR of the display panel 110*c*, the panel driver 120 may drive the moving image region MR of the display panel 110*c* at the normal driving frequency NDF, and drive the still image region SR of the display panel 110*c* at the low frequency LF that is lower than the normal driving frequency NDF at the same time or sequentially. In other words, the multi-frequency driving (MFD) for driving the moving image region MR and the still image region SR of the display panel 110*c* at mutually different driving frequencies NDF and LF may be performed at the same time or sequentially. For example, the still image detector 160 may determine that the moving image is displayed in the moving image region MR of the display panel 110*c* when the input image data IDAT for the moving image region MR in the previous frame is different from the input image data IDAT for the moving image region MR in the current frame. In addition, the still image detector 160 may determine that the still image is displayed in the still image region SR of the display panel 110*c* when the input image data IDAT for the still image region SR in the previous frame is identical to the input image data IDAT for the still image region SR in the current frame. For example, the still image detector 160 may detect the moving image region MR and the still image region SR, which have arbitrary positions for every frame, by analyzing the input image data IDAT. The still image detector 160 may determine the boundary line for dividing the image represented by the input image data IDAT into the region in which the moving image is displayed and the region in which the still image is displayed. In this example, the boundary may be fixed, and in another example, the boundary may be adjustable. The driving frequency calculator 170 may calculate the driving frequency for driving the moving image region MR and the driving frequency for driving the still image region SR based on the boundary line. For example, the driving frequency calculator 170 may calculate the normal driving frequency NDF required for driving the moving image region MR, and calculate the low frequency LF required for driving the still image region SR. The driving frequency decider 180 may determine the normal driving frequency NDF as a driving frequency for the moving image region MR of the display panel 110*c*, which is determined as displaying the moving image by the still image detector 160, and determine the low frequency LF as a driving frequency for the still image region SR of the display panel 110*c*, which is determined as displaying the still image by the still image detector 160. The panel driver 120 may perform the normal-frequency driving operation on the moving image region MR of the display panel 110*c*, and perform the low-frequency driving operation on the still image region SR of the display panel 110*c*. In other words, the panel driver 120 may drive the moving image region MR of the display panel 110*c* at the normal driving frequency NDF determined by the driving frequency decider 180, and drive the still image region SR of the display panel 110*c* at the low frequency LF determined by the driving frequency decider 180.

As shown in FIG. 4, the entire display region may be divided into the moving image region MR driven at the normal driving frequency NDF of about 120 Hz and the still image region SR driven at the low frequency LF of about 15 Hz based on the boundary line. The controller 150 may receive the input image data IDAT including frame data FDAT. The controller 150 may output, to the data driver 130, moving image data MDAT for the moving image region MR at about 120 Hz and still image data SDAT for the still image region SR at about 15 Hz as the output image data ODAT. For example, the controller 150 may receive the frame data FDAT eight times during eight frames as the input image data IDAT. The controller 150 may output, to the data driver 130, the moving image data MDAT eight times and the still image data SDAT only once during the eight frames as the output image data ODAT. Based on the output image data ODAT, the data driver 130 may provide the data signals DS to the moving image region MR at about 120 Hz, and provide the data signals DS to the still image region SR at about 15 Hz. In addition, the scan driver 140 may provide the scan signals SS to the moving image region MR at about 120 Hz, and provide the scan signals SS to the still image region SR at about 15 Hz. Accordingly, the moving image region MR may be driven at the normal driving frequency NDF of about 120 Hz, and the still image region SR may be driven at the low frequency LF of about 15 Hz. Although an example in which the normal driving frequency NDF is about 120 Hz and the low frequency LF is about 15 Hz has been shown in FIG. 4, the normal driving frequency NDF and the low frequency LF are not limited to the example of FIG. 4.

Meanwhile, when the display device 100 performs the multi-frequency driving, the still image region SR in which the still image is displayed may be divided into a plurality of sub-still image regions SR. The sub-still image regions SR may have mutually different driving frequencies according to the input image data IDAT. For example, a driving frequency of a first sub-still image region SR1 may be a first low frequency LF1, and a driving frequency of a second sub-still image region SR2 may be a second low frequency LF2 that is lower than the first low frequency LF1. The still image region SR may be driven at a highest driving frequency (e.g., the first low frequency LF1) among the driving frequencies of the sub-still image regions SR.

When an area occupied by the first sub-still image region SR1 of the still image region SR is relatively small as compared to an area occupied by the second sub-still image region SR2 of the still image region SR, since the entire still image region SR are driven at the highest driving frequency (e.g., the first low frequency LF1) among the driving frequencies of the sub-still image regions SR, an overall power consumption consumed for driving the still image region SR may increase. According to the present disclosure, in order to minimize a power consumed when the multi-frequency driving is performed, the display device 100 may calculate a power consumption required to drive the display panel based on the normal driving frequency NDF and the low frequency LF, and drive a partial section of the still image region SR at the normal driving frequency NDF based on the power consumption.

Figure 5:
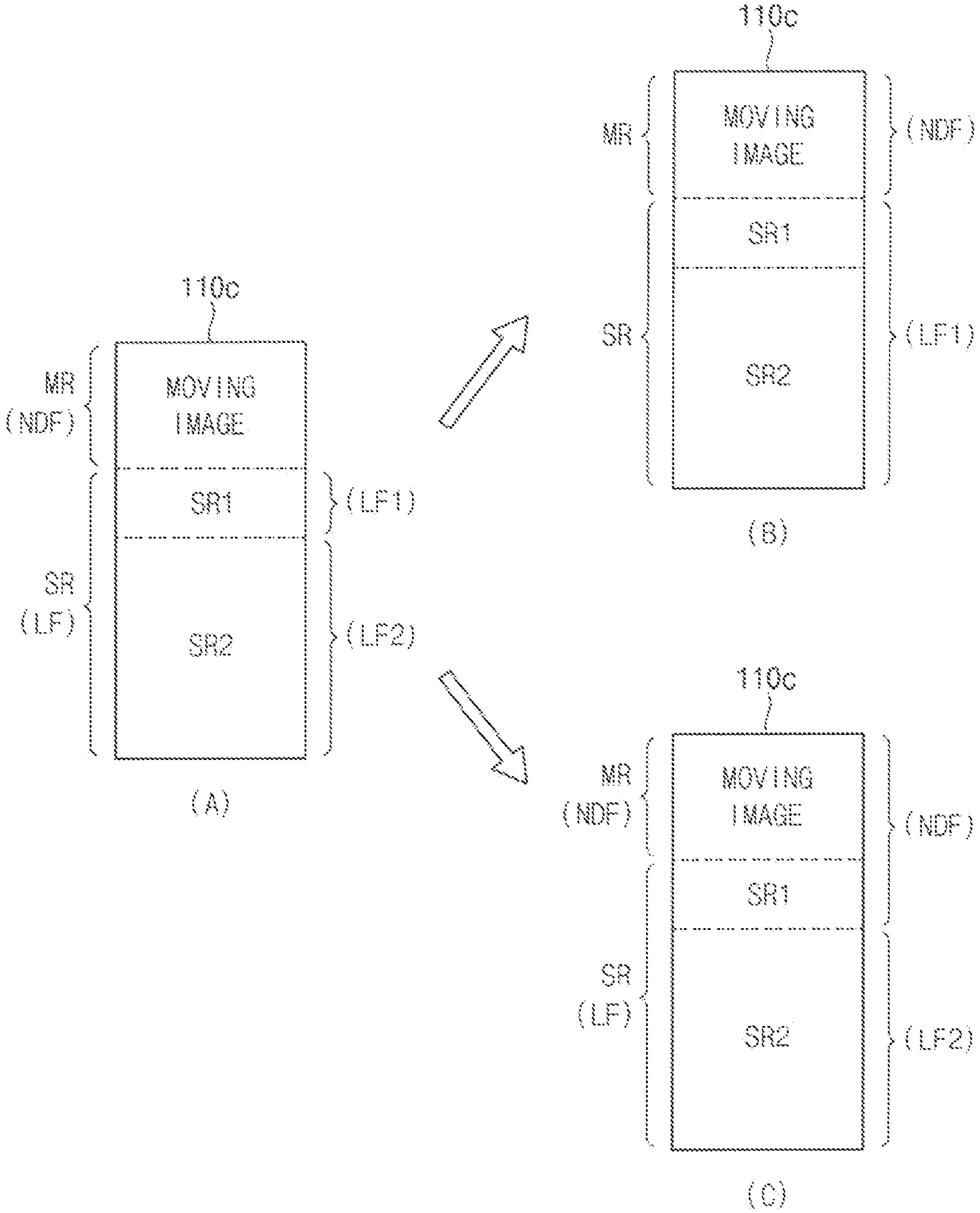
FIG. 5 is a diagram showing an example in which an image is displayed on a display panel when driving frequencies of first and second sub-still image regions are different from each other.
Figure 6A:
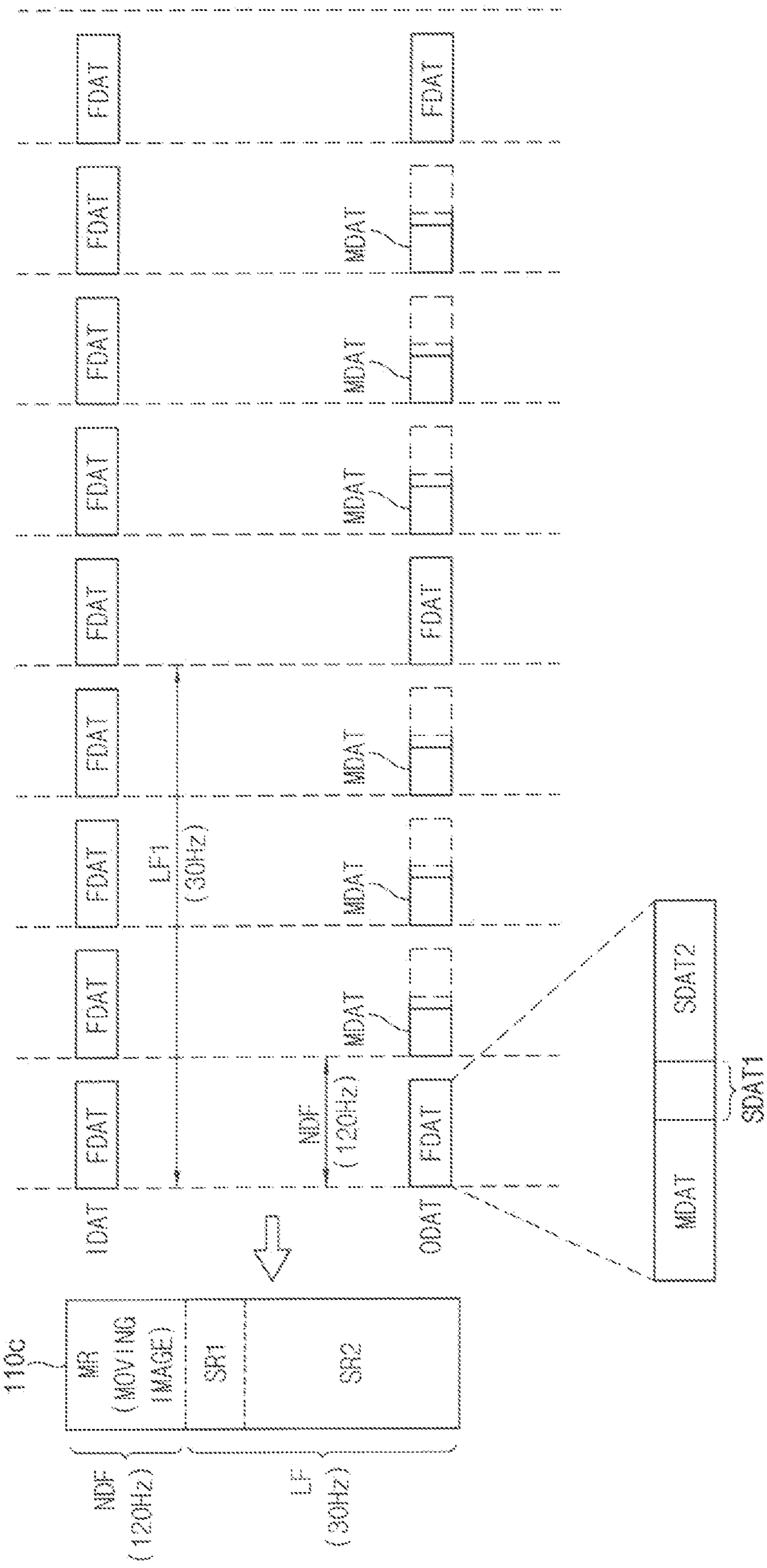
FIGS. 6A and 6B are diagrams showing a normal-frequency driving operation and a low-frequency driving operation in a case of FIG. 5.
Figure 6B:
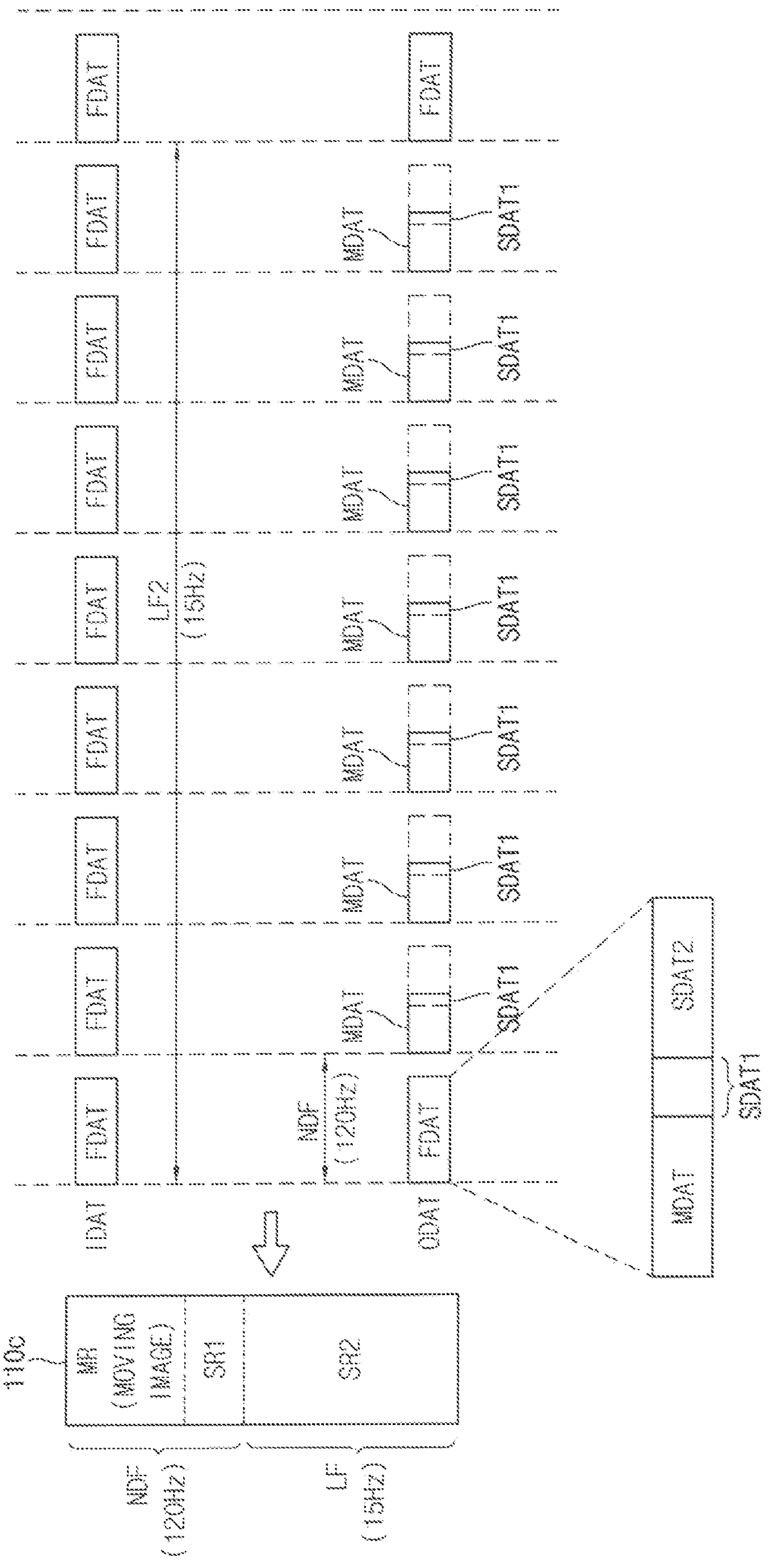
Figure 7:
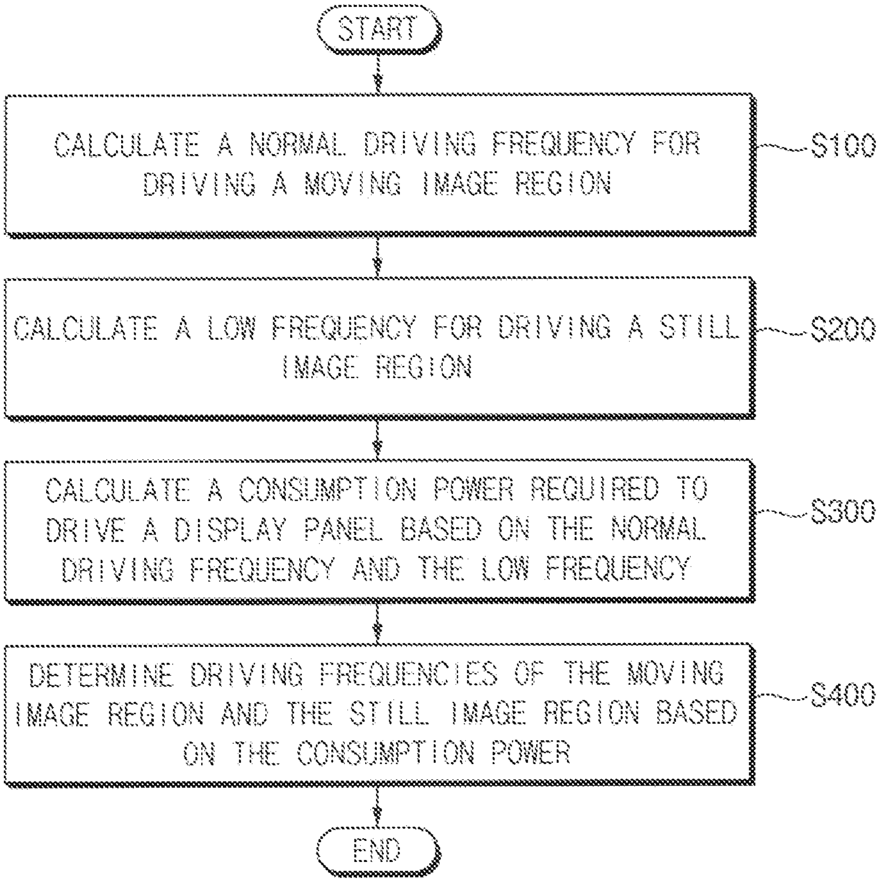
FIG. 7 is a flowchart showing an example of an operation of a display device according to embodiments in a case of FIG. 5.
Figure 8:
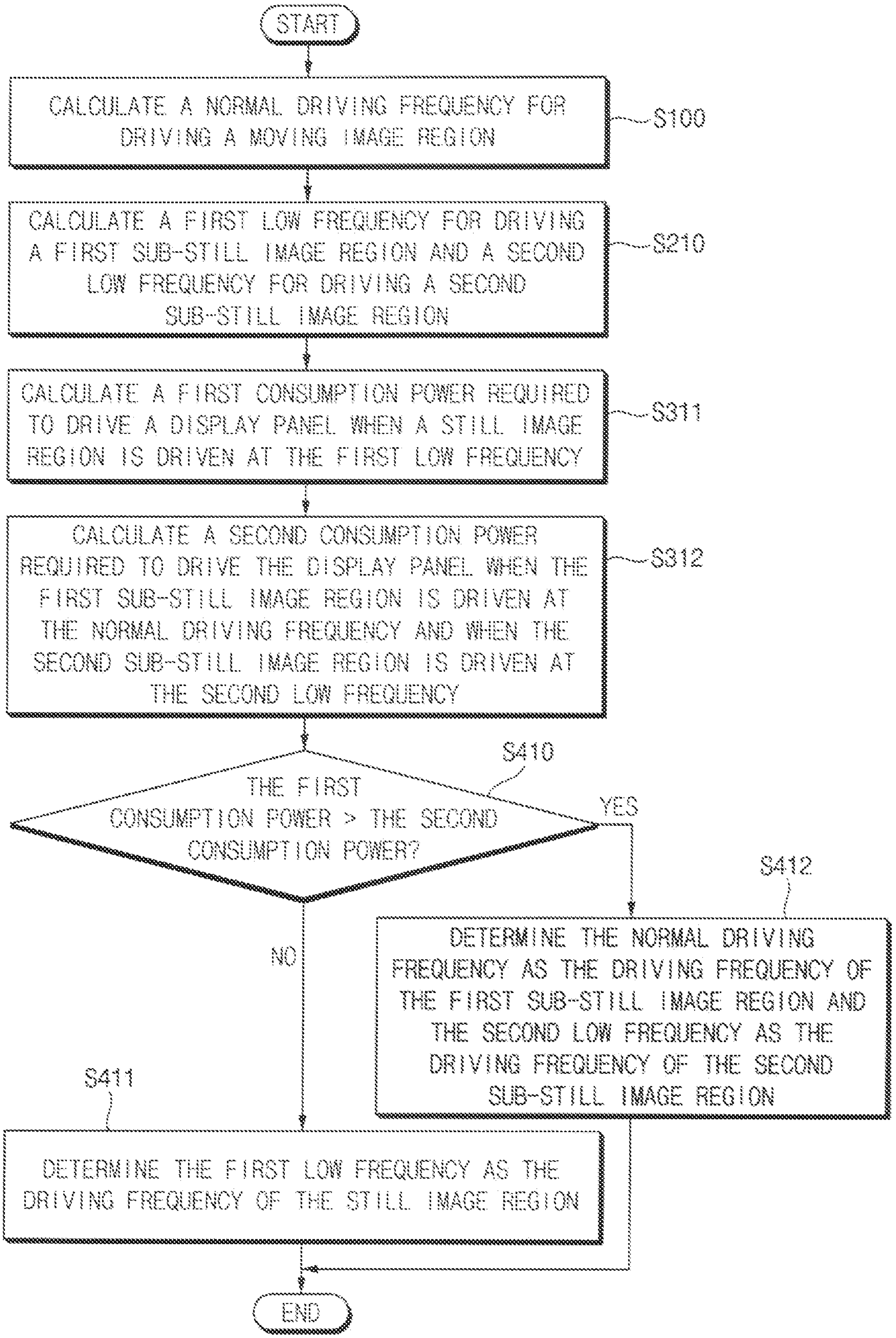
FIG. 8 is a flowchart showing another example of an operation of a display device according to embodiments in a case of FIG. 5.

FIG. 5 is a diagram showing an example in which an image is displayed on a display panel when driving frequencies of first and second sub-still image regions are different from each other, FIGS. 6A and 6B are diagrams showing a normal-frequency driving operation and a low-frequency driving operation in a case of FIG. 5, FIG. 7 is a flowchart showing an example of an operation of a display device according to embodiments in a case of FIG. 5, and FIG. 8 is a flowchart showing another example of an operation of a display device according to embodiments in a case of FIG. 5.

Referring to FIGS. 2, 5, 6, 7, and 8, the display device 100 may detect a still image from an image represented by input image data IDAT by analyzing the input image data IDAT, may calculate a normal driving frequency NDF for driving a moving image region MR (S100), may calculate a low frequency LF for driving a still image region SR (S200), may calculate a power consumption required to drive a display panel based on the normal driving frequency NDF and the low frequency LF (S300), and may determine driving frequencies of the moving image region MR and the still image region SR based on the power consumption (S400). To perform the above operation, the panel driver may include a controller 150 including a still image detector 160, a driving frequency calculator 170, and a driving frequency decider 180.

The still image detector 160 may detect the still image from the image represented by the input image data IDAT by analyzing the input image data IDAT. The still image detector 160 may determine a boundary line for dividing the image represented by the input image data IDAT into a region in which a moving image is displayed and a region in which a still image is displayed. The still image detector 160 may generate moving image data MDAT and still image data SDAT by dividing frame data FDAT included in the input image data IDAT. The still image detector 160 may output the moving image data MDAT and the still image data SDAT to the driving frequency calculator 170.

The driving frequency calculator 170 may calculate the normal driving frequency NDF for driving the moving image region MR (S100) and may calculate the low frequency LF for driving the still image region SR (S200). The driving frequency calculator 170 may calculate the normal driving frequency NDF for driving a moving image represented by the input image data IDAT, and calculate a driving frequency required for driving a still image represented by the input image data IDAT. The still image region SR may include a first sub-still image region SR1 and a second sub-still image region SR2. The first sub-still image region SR1 may be adjacent to the moving image region MR.

In an embodiment, the driving frequency calculator 170 may calculate a first low frequency LF1 for driving the first sub-still image region SR1, and calculate a second low frequency LF2 for driving the second sub-still image region SR2 (S210). The first low frequency LF1 may be higher than the second low frequency LF2. In other words, the first sub-still image region SR1 may be driven at a relatively high driving frequency as compared to the second sub-still image region SR2. The driving frequency calculator 170 may generate driving frequency data DFDAT including the normal driving frequency NDF for driving the moving image region MR and the low frequency LF for driving the still image region SR. The driving frequency calculator 170 may output the driving frequency data DFDAT to the driving frequency decider 180.

The driving frequency decider 180 may calculate the power consumption required to drive the display panel based on the normal driving frequency NDF and the low frequency LF (S300). The driving frequency decider 180 may calculate a first power consumption required to drive the display panel when the still image region SR is driven at the first low frequency LF1 (S311). The driving frequency decider 180 may calculate a second power consumption required to drive the display panel when the first sub-still image region SR1 is driven at the normal driving frequency NDF, and the second sub-still image region SR2 is driven at the second low frequency LF2 (S312). The driving frequency decider 180 may compare the first power consumption and the second power consumption to each other (S410). When an area occupied by the first sub-still image region SR1 of the still image region SR is relatively small as compared to an area occupied by the second sub-still image region SR2 of the still image region SR, the first power consumption may be greater than the second power consumption. In other words, a power consumption when the entire still image region SR is driven at the first low frequency LF1 may be greater than a power consumption when the first sub-still image region SR1 is driven at the normal driving frequency NDF, and the second sub-still image region SR2 is driven at the second low frequency LF2. The driving frequency decider 180 may determine the first low frequency LF1 as the driving frequency of the still image region SR when the first power consumption is less than or equal to the second power consumption (S411). The driving frequency decider 180 may determine the normal driving frequency NDF as a driving frequency of the first sub-still image region SR1 and determine the second low frequency LF2 as a driving frequency of the second sub-still image region SR2 when the first power consumption is greater than the second power consumption (S412).

In detail, as shown in (A) of FIG. 5, the still image region SR may include a first sub-still image region SR1 and a second sub-still image region SR2. The first sub-still image region SR1 may be adjacent to the moving image region MR. A driving frequency required for driving the first sub-still image region SR1 may be a first low frequency LF1, and a driving frequency require for driving the second sub-still image region SR2 may be a second low frequency LF2. The first low frequency LF1 may be higher than the second low frequency LF2. In other words, the first sub-still image region SR1 may be driven at a relatively high driving frequency as compared with the second sub-still image region SR2. For example, as shown in FIGS. 6A and 6B, the normal driving frequency NDF may be 120 Hz, the first low frequency LF1 may be 30 Hz, and the second low frequency LF2 may be 15 Hz.

As shown in (B) of FIG. 5, the driving frequency decider 180 may determine the normal driving frequency NDF as the driving frequency for the moving image region MR and determine the first low frequency LF1 as the driving frequency for the still image region SR when the first power consumption is less than or equal to the second power consumption. For example, as shown in FIG. 6A, the entire display region may be divided into the moving image region MR driven at the normal driving frequency NDF of about 120 Hz and the still image region SR driven at the first low frequency LF1 of about 30 Hz based on the boundary line. The controller 150 may output, to the data driver 130, the moving image data MDAT for the moving image region MR at about 120 Hz and first sub-still image data SDAT1 and second sub-still image data SDAT2 for the still image region SR at about 30 Hz as the output image data ODAT. For example, the controller 150 may receive the frame data FDAT four times during four frames as the input image data IDAT. The controller 150 may output, to the data driver 130, the moving image data MDAT four times and the still image data SDAT only once during the four frames as the output image data ODAT. Based on the output image data ODAT, the data driver 130 may provide the data signals DS to the moving image region MR at about 120 Hz, and provide the data signals DS to the still image region SR at about 30 Hz. In addition, the scan driver 140 may provide the scan signals SS to the moving image region MR at about 120 Hz, and provide the scan signals SS to the still image region SR at about 30 Hz.

As shown in (C) of FIG. 5, the driving frequency decider 180 may determine the normal driving frequency NDF as the driving frequencies of the moving image region MR and the first sub-still image region SR1 and determine the second low frequency LF2 as the driving frequency of the second sub-still image region SR2 when the first power consumption is greater than the second power consumption. For example, as shown in FIG. 6B, the moving image region MR and the first sub-still image region SR1 may be driven at the normal driving frequency NDF of about 120 Hz, and the second sub-still image region SR2 may be driven at the low frequency LF of about 15 Hz. The controller 150 may output, to the data driver 130, the moving image data MDAT and the first sub-still image data SDAT1 at about 120 Hz and the second sub-still image data SDAT2 at about 15 Hz as the output image data ODAT. For example, the controller 150 may receive the frame data FDAT eight times during eight frames as the input image data IDAT. The controller 150 may output, to the data driver 130, the moving image data MDAT and the first sub-still image data SDAT1 eight times and the second sub-still image data SDAT2 only once during the eight frames as the output image data ODAT. Based on the output image data ODAT, the data driver 130 may provide the data signals DS to the moving image region MR and the first sub-still image region SR1 at about 120 Hz, and provide the data signals DS to the second sub-still image region SR2 at about 15 Hz. In addition, the scan driver 140 may provide the scan signals SS to the moving image region MR and the first sub-still image region SR1 at about 120 Hz, and provide the scan signals SS to the second sub-still image region SR2 at about 15 Hz. Accordingly, the moving image region MR and the first sub-still image region SR1 may be driven at the normal driving frequency NDF of about 120 Hz, and the second sub-still image region SR2 may be driven at the low frequency LF of about 15 Hz.

As described above, when the display device 100 calculates the power consumption required to drive the display panel, and compares the power consumption to each other to drive a partial section of the still image region SR at the normal driving frequency NDF instead of the low frequency LF and to drive a remaining section of the still image region SR except for the partial section at a low frequency that is relatively lower than the low frequency LF, according to the display device 100, when the multi-frequency driving is performed, the power consumed by the display panel may be minimized.

Figure 9:
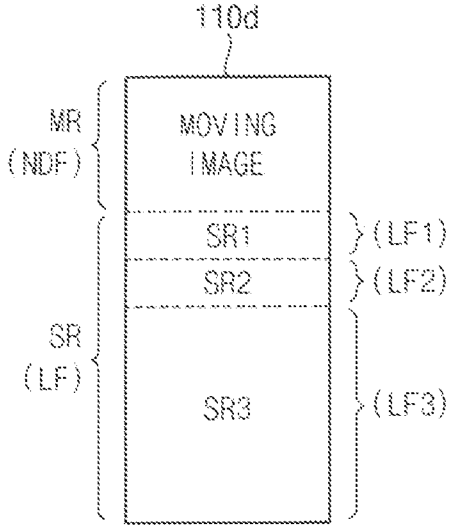
FIG. 9 is a diagram showing an example in which an image is displayed on a display panel when driving frequencies of first to third sub-still image regions are different from each other.
Figure 10A:
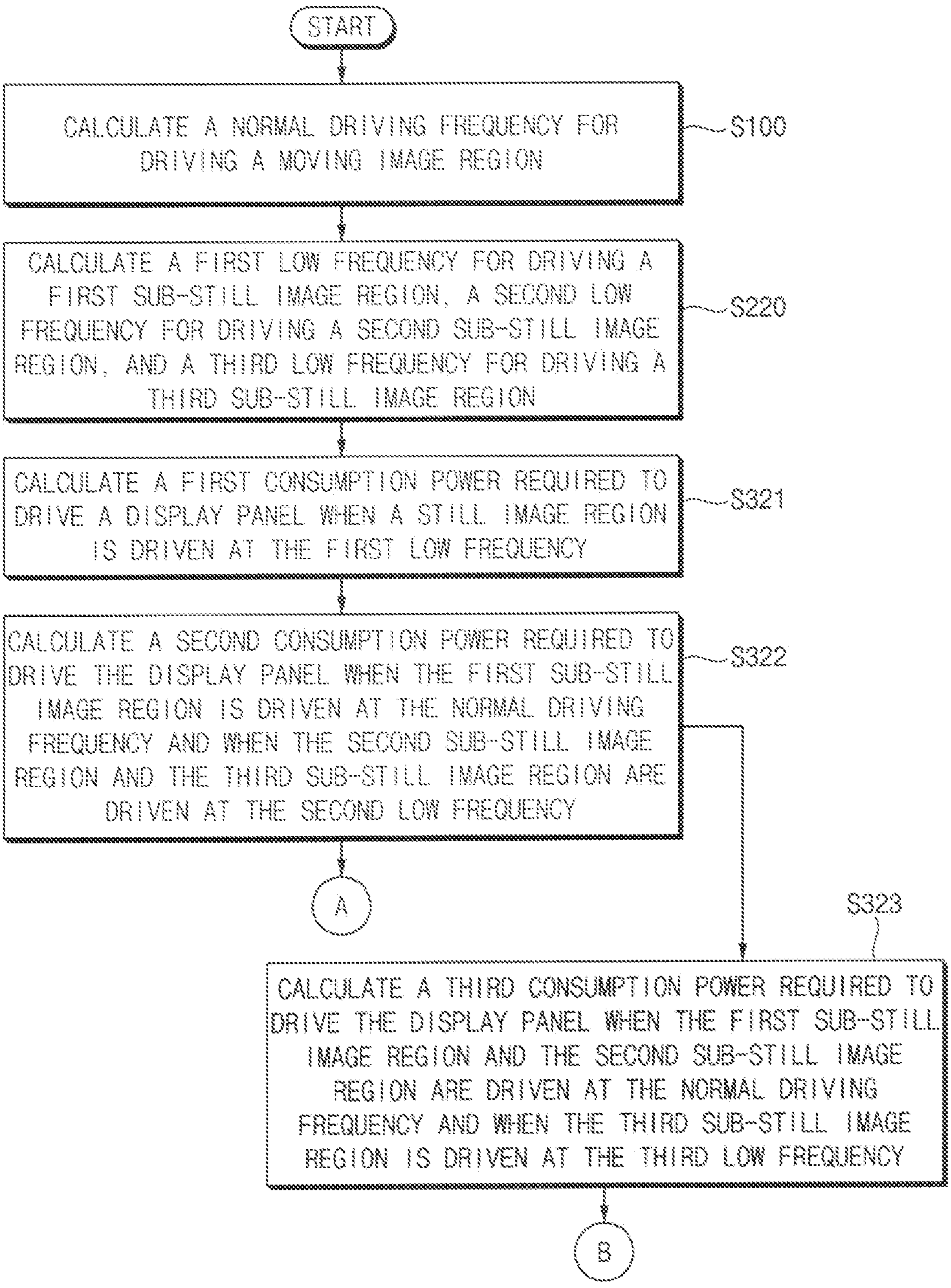
FIGS. 10A and 10B are flowcharts showing an example of an operation of a display device according to embodiments in a case of FIG. 9.
Figure 10B:
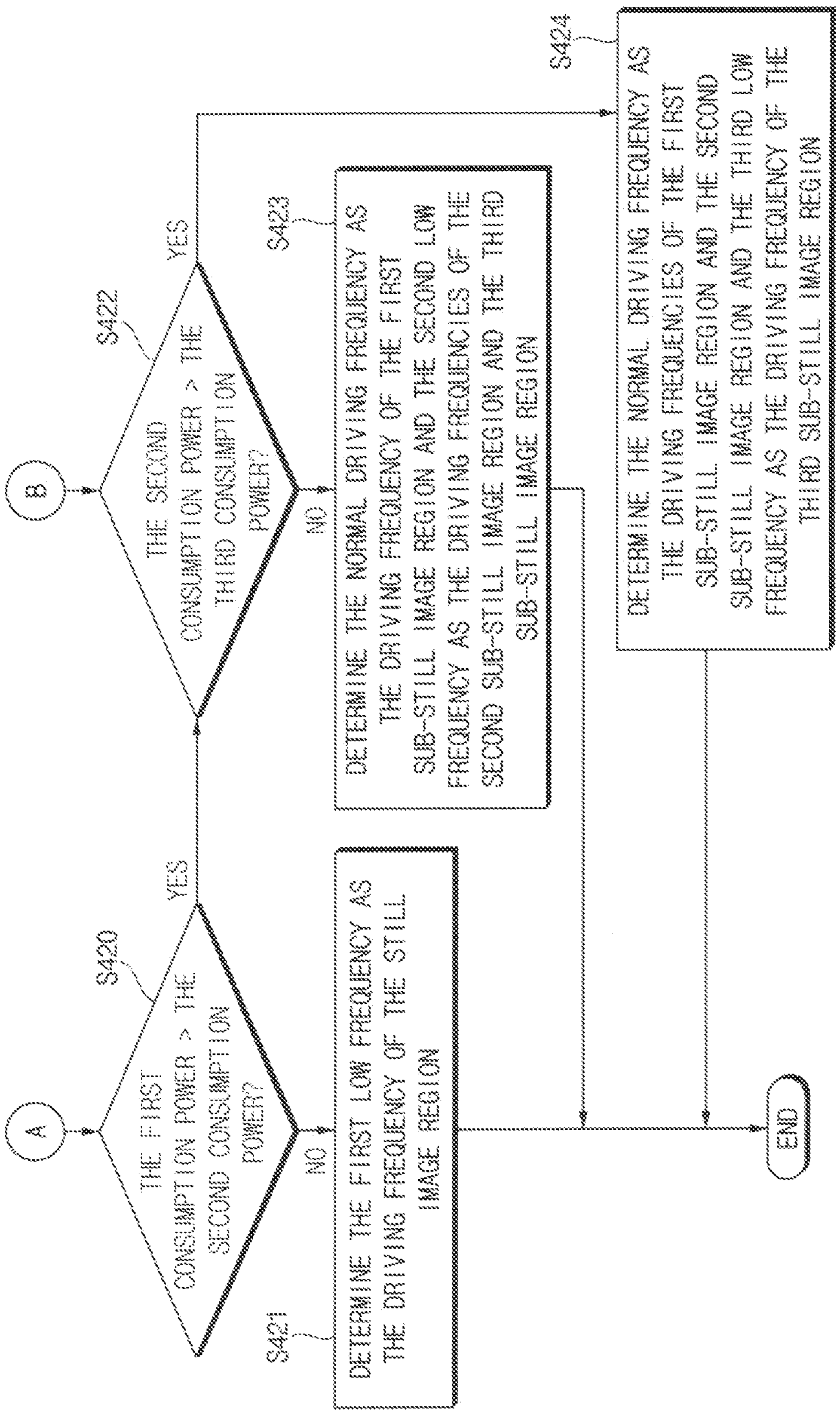

FIG. 9 is a diagram showing in which an image is displayed on a display panel when driving frequencies of first to third sub-still image regions are different from each other, and FIGS. 10A and 10B are flowcharts showing an example of an operation of a display device according to embodiments in a case of FIG. 9.

Referring to FIGS. 2, 9, 10A, and 10B, the still image region SR may include a first sub-still image region SR1, a second sub-still image region SR2, and a third sub-still image region SR3. The first sub-still image region SR1 may be adjacent to the moving image region MR. The second sub-still image region SR2 may be adjacent to the first sub-still image region SR1. The third sub-still image SR3 may be adjacent to the second sub-still image region SR2. The driving frequency calculator 170 may calculate a normal driving frequency NDF for driving the moving image region MR (S100) and may calculate a first low frequency LF1 for driving the first sub-still image region SR1, a second low frequency LF2 for driving the second sub-still image region SR2, and a third low frequency LF3 for driving the third sub-still image region SR3 (S220). The first low frequency LF1 may be higher than the second low frequency LF2, and the second low frequency LF2 may be higher than the third low frequency LF3.

The driving frequency decider 180 may calculate a power consumption required to drive a display panel based on the normal driving frequency NDF and the low frequency LF. The driving frequency decider 180 may calculate a first power consumption required to drive the display panel when the still image region SR is driven at the first low frequency LF1 (S321). The driving frequency decider 180 may calculate a second power consumption required to drive the display panel when the first sub-still image region SR1 is driven at the normal driving frequency NDF, and the second sub-still image region SR2 and the third sub-still image region SR3 are driven at the second low frequency LF2 (S322). The driving frequency decider 180 may calculate a third power consumption required to drive the display panel when the first sub-still image region SR1 and the second sub-still image region SR2 are driven at the normal driving frequency NDF, and the third sub-still image region SR3 is driven at the third low frequency LF3 (S323).

The driving frequency decider 180 may compare the first power consumption and the second power consumption to each other (S420). When an area occupied by the first sub-still image region SR1 of the still image region SR is relatively small as compared with an area occupied by the second sub-still image region SR2 and the third sub-still image region SR3 of the still image region SR, the first power consumption may be greater than the second power consumption. In other words, a power consumption when the entire still image region SR is driven at the first low frequency LF1 may be greater than a power consumption when the first sub-still image region SR1 is driven at the normal driving frequency NDF, and the second sub-still image region SR2 and the third sub-still image region SR3 are driven at the second low frequency LF2. The driving frequency decider 180 may determine the first low frequency LF1 as the driving frequency of the still image region SR when the first power consumption is less than or equal to the second power consumption (S421).

The driving frequency decider 180 may compare the second power consumption and the third power consumption to each other when the first power consumption is greater than the second power consumption (S422). When an area occupied by the second sub-still image region SR2 of the still image region SR is relatively small as compared to an area occupied by the third sub-still image region SR3 of the still image region SR, the second power consumption may be greater than the third power consumption. In other words, a power consumption when both the second sub-still image region SR2 and the third sub-still image region SR3 are driven at the second low frequency LF2 may be greater than a power consumption when the second sub-still image region SR2 is driven at the normal driving frequency NDF, and the third sub-still image region SR3 is driven at the third low frequency LF3. The driving frequency decider 180 may determine the normal driving frequency NDF as the driving frequency of the first sub-still image region SR1 and the second low frequency LF2 as the driving frequencies of the second sub-still image region SR2 and the third sub-still image region SR3 when the second power consumption is less than or equal to the third power consumption (S423). The driving frequency decider 180 may determine the normal driving frequency NDF as the driving frequencies of the first sub-still image region SR1 and the second sub-still image region SR2 and the third low frequency LF3 as the driving frequency of the third sub-still image region SR3 when the second power consumption is greater than the third power consumption (S424).

As described above, when the display device 100 calculates the power consumption required to drive a plurality of sub-still image regions SR, and sequentially compares the power consumption to each other to drive the partial section of the still image region SR at the normal driving frequency NDF instead of the low frequency LF and to drive the remaining section of the still image region SR except for the partial section at a low frequency that is relatively lower than the low frequency LF, according to the display device 100, when the multi-frequency driving is performed, the power consumed by the display panel may be minimized more effectively.

Figure 11:
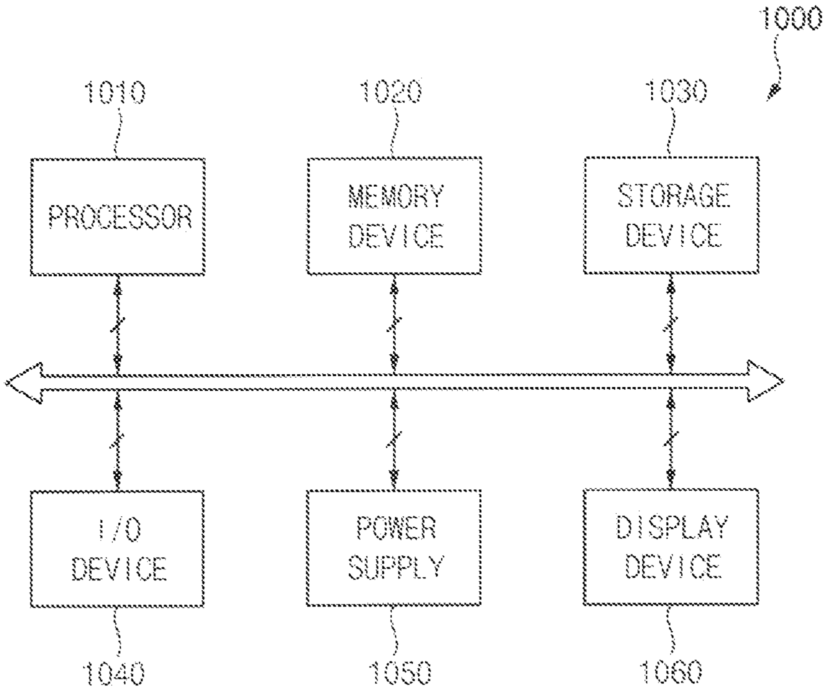
FIG. 11 is a block diagram showing an electronic device according to embodiments.
Figure 12:
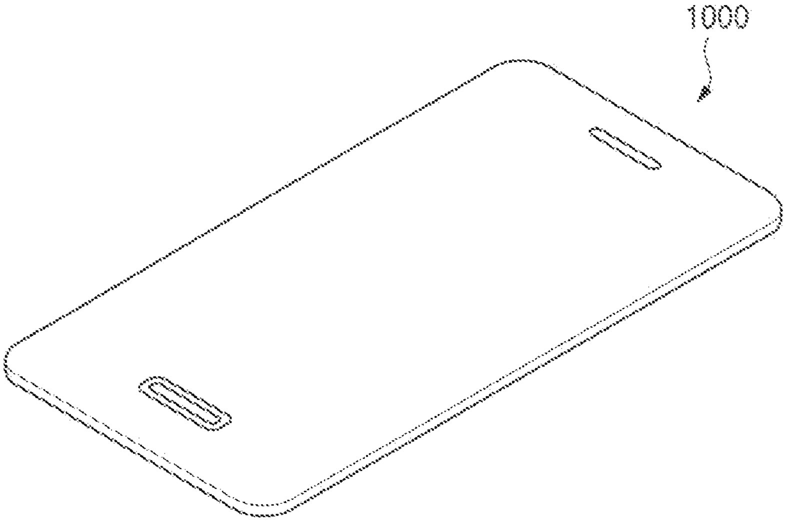
FIG. 12 is a diagram showing an example in which the electronic device of FIG. 11 is implemented as a smart phone.

FIG. 11 is a block diagram showing an electronic device according to embodiments, and FIG. 12 is a diagram showing an example in which the electronic device of FIG. 11 is implemented as a smart phone.

Referring to FIGS. 11 and 12, the electronic device 1000 may include a processor 1010, a memory device 1020, a storage device 1030, an input/output (I/O) device 1040, a power supply 1050, and a display device 1060. Here, the display device 1060 may be the display device 100 of FIG. 1. In addition, the electronic device 1000 may further include a plurality of ports for communicating with a video card, a sound card, a memory card, a universal serial bus (USB) device, other electronic devices, etc. In an embodiment, as shown in FIG. 12, the electronic device 1000 may be implemented as a smart phone. However, the electronic device 1000 is not limited thereto. For example, the electronic device 1000 may be implemented as a cellular phone, a video phone, a smart pad, a smart watch, a tablet PC, a car navigation system, a computer monitor, a laptop, a head mounted display (HMD) device, etc.

The processor 1010 may perform various computing functions. The processor 1010 may be a micro processor, a central processing unit (CPU), an application processor (AP), etc. The processor 1010 may be coupled to other components via an address bus, a control bus, a data bus, etc. Further, the processor 1010 may be coupled to an extended bus such as a peripheral component interconnection (PCI) bus. The memory device 1020 may store data for operations of the electronic device 1000. For example, the memory device 1020 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, etc and/or at least one volatile memory device such as a dynamic random access memory (DRAM) device, a static random access memory (SRAM) device, a mobile DRAM device, etc. The storage device 1030 may include a solid state drive (SSD) device, a hard disk drive (HDD) device, a CD-ROM device, etc. The I/O device 1040 may include an input device such as a keyboard, a keypad, a mouse device, a touch pad, a touch screen, etc, and an output device such as a printer, a speaker, etc. In some embodiments, the I/O device 1040 may include the display device 1060. The power supply 1050 may provide power for operations of the electronic device 1000. The display device 1060 may be coupled to other components via the buses or other communication links.

The display device 1060 may display an image corresponding to visual information of the electronic device 1000. Here, the display device 1060 may include a display panel having a display region, and a panel driver configured to drive the display panel based on input image data, as stated above. The panel driver may calculate a normal driving frequency for driving a first partial region and a low frequency for driving a second partial region when the input image data represents a moving image for the first partial region of the display region, and represents a still image for the second partial region of the display region. The panel driver may calculate a power consumption required to drive the display panel when an entire section of the second partial region is driven at a same low frequency, calculate a power consumption required to drive the display panel when a partial section of the second partial region and a remaining section of the second partial region are driven at mutually different frequencies, and determine a driving frequency of the second partial region by comparing the power consumption to each other. In other words, when a multi-frequency driving for driving display regions of a display panel at mutually different driving frequencies is performed, the display device may calculate power consumption required to drive the display panel and may compare the power consumption to each other to drive a partial section of a still image region at a normal driving frequency instead of a low frequency and to drive a remaining section of the still image region except for the partial section at a low frequency that is relatively lower than the low frequency. Therefore, the display device may minimize (or reduce) a power consumed by the display panel when the multi-frequency driving is performed. Since these are described above, duplicated description related thereto will not be repeated.

The present disclosure may be applied to a display device and an electronic device including the display device. For example, the present disclosure may be applied to a cellular phone, a smart phone, a personal computer (PC), a tablet PC, a television (TV), a digital TV, a three-dimensional (3D) TV, a laptop, a home electronic device, a personal digital assistants (PDA), a portable multimedia player (PMP), a digital camera, a music player, a portable game console, a car navigation system, etc.

The foregoing is illustrative of embodiments and is not to be construed as limiting thereof. Although a few embodiments have been described, those skilled in the art will readily appreciate that many modifications are possible in the embodiments without materially departing from the novel teachings and advantages of the present disclosure. Accordingly, all such modifications are intended to be included within the scope of the present disclosure as defined in the claims. Therefore, it is to be understood that the foregoing is illustrative of various embodiments and is not to be construed as limited to the specific embodiments disclosed, and that modifications to the disclosed embodiments, as well as other embodiments, are intended to be included within the scope of the appended claims.

What is claimed is:

1. A display device comprising:

a display panel having a display region including a first partial region and a second partial region; and a panel driver configured to drive the display panel based on input image data, wherein the panel driver is configured to:

provide a normal driving frequency for driving the first partial region of the display region and a low frequency for driving the second partial region of the display region, wherein the input image data represents a moving image for the first partial region and represents a still image for the second partial region, provide a first power consumption required to drive the display panel when an entirety of the second partial region is driven at a same low frequency, provide a second power consumption required to drive the display panel when a first section of the second partial region and a second section of the second partial region are driven at different frequencies, and determine a driving frequency of the second partial region, wherein a range of a display region to be driven at the normal driving frequency is changeable between including and excluding the first section of the second partial region depending on the relationship between the first power consumption and the second power consumption, wherein determining the driving frequency of the second partial region comprises providing the driving frequency of the second partial region by comparing the first power consumption and the second power consumption, wherein the first partial region displaying the moving image extends along a first direction and meets two opposite sides of the display region along the first direction, and the second partial region displaying the still image is disposed adjacent to the first partial region in a second direction which is perpendicular to the first direction and is not adjacent to the first partial region in the first direction, and wherein the first partial region displaying the moving image is formed continuously along the first direction and the second direction, and the first section of the second partial region, which is the included or excluded display region to be driven at the normal driving frequency, is not disposed in a middle of the first partial region.

2. The display device of claim 1, wherein the first partial region is a moving image region, and the second partial region is a still image region, wherein the still image region includes a first sub-still image region and a second sub-still image region, and wherein the panel driver is configured to provide a first low frequency for driving the first sub-still image region and to provide a second low frequency for driving the second sub-still image region.

3. The display device of claim 2, wherein the first sub-still image region is adjacent to the moving image region, and wherein the first low frequency is higher than the second low frequency.

4. The display device of claim 3, wherein the panel driver is configured to:

provide a third power consumption to drive the display panel when the still image region is driven at the first low frequency, provide a fourth power consumption to drive the display panel when the first sub-still image region is driven at the normal driving frequency, and when the second sub-still image region is driven at the second low frequency, and determine a driving frequency of the still image region by comparing the third power consumption and the fourth power consumption to each other.

5. The display device of claim 4, wherein the panel driver is configured to determine the first low frequency as the driving frequency of the still image region when the third power consumption is less than or equal to the fourth power consumption.

6. The display device of claim 4, wherein the panel driver is configured to determine the normal driving frequency as a driving frequency of the first sub-still image region and determine the second low frequency as a driving frequency of the second sub-still image region when the third power consumption is greater than the fourth power consumption.

7. The display device of claim 1, wherein the panel driver includes:

a still image detector configured to detect the still image from an image represented by the input image data by analyzing the input image data.

8. The display device of claim 7, wherein the panel driver further includes:

a driving frequency calculator configured to provide the normal driving frequency for driving the first partial region, which is determined as displaying the moving image by the still image detector, and to provide the low frequency for driving the second partial region, which is determined as displaying the still image by the still image detector.

9. The display device of claim 8, wherein the panel driver further includes:

a driving frequency decider configured to provide a third power consumption required to drive the display panel when the entire second partial region is driven at the first low frequency, to provide a fourth power consumption required to drive the display panel when the partial section of the second partial region is driven at the normal driving frequency and when the remaining section of the second partial region is driven at the second low frequency that is lower than the first low frequency, and to determine the driving frequency of the second partial region by comparing the third power consumption and the fourth power consumption to each other.

10. The display device of claim 1, wherein the first partial region is a moving image region, and the second partial region is a still image region, wherein the still image region includes a first sub-still image region, a second sub-still image region, and a third sub-still image region, and wherein the panel driver is configured to provide the first low frequency for driving the first sub-still image region, to provide the second low frequency for driving the second sub-still image region, and to provide a third low frequency for driving the third sub-still image region.

11. The display device of claim 10, wherein the first sub-still image region is adjacent to the moving image region, and the second sub-still image region is adjacent to the first sub-still image region, and wherein the first low frequency is higher than the second low frequency, and the second low frequency is higher than the third low frequency.

12. The display device of claim 11, wherein the panel driver is configured to:

provide a third power consumption to drive the display panel when the still image region is driven at the first low frequency, provide a fourth power consumption to drive the display panel when the first sub-still image region is driven at the normal driving frequency, and when the second sub-still image region and the third sub-still image region are driven at the second low frequency, and determine the normal driving frequency as a driving frequency of the first sub-still image region and determine the second low frequency as a driving frequency of the second sub-still image region and a driving frequency of the third sub-still image region when the third power consumption is greater than the fourth power consumption.

13. The display device of claim 12, wherein the panel driver is configured to:

provide a fifth power consumption required to drive the display panel when the first sub-still image region and the second sub-still image region are driven at the normal driving frequency and when the third sub-still image region is driven at the third low frequency, and determine the normal driving frequency as the driving frequency of the first sub-still image region and the driving frequency of the second sub-still image region and determine the third low frequency as the driving frequency of the third sub-still image region when the fourth power consumption is greater than the fifth power consumption.

14. A method of driving a display device which includes a display panel having a display region including a first partial region and a second partial region, the method comprising:

providing a normal driving frequency for driving the first partial region of the display region when input image data represents a moving image for the first partial region;

providing a low frequency for driving the second partial region of the display region when the input image data represents a still image for the second partial region;

providing a power consumption required to drive the display panel based on the normal driving frequency and the low frequency; and determining a driving frequency of the first partial region and a driving frequency of the second partial region, wherein providing the power consumption required to drive the display panel comprises providing a first power consumption required to drive the display panel if an entire second partial region is driven at a same low frequency and a second power consumption required to drive the display panel if a first section of the second partial region and a second section of the second partial region are driven at different frequencies, wherein determining the driving frequency of the first partial region and the driving frequency of the second partial region comprises providing the driving frequency of the second partial region by comparing the first power consumption and the second power consumption, wherein a range of a display region to be driven at the normal driving frequency is changeable between including and excluding the first section of the second partial region depending on the relationship between the first power consumption and the second power consumption, wherein the first partial region displaying the moving image extends along a first direction and meets two opposite sides of the display region along the first direction, and the second partial region displaying the still image is disposed adjacent to the first partial region in a second direction which is perpendicular to the first direction and is not adjacent to the first partial region in the first direction, and wherein the first partial region displaying the moving image is formed continuously along the first direction and the second direction, and the first section of the second partial region, which is the included or excluded display region to be driven at the normal driving frequency, is not disposed in a middle of the first partial region.

15. The method of claim 14, wherein the first partial region is a moving image region, and the second partial region is a still image region, wherein the still image region includes a first sub-still image region and a second sub-still image region, and wherein providing the low frequency for driving the second partial region is accomplished by: providing a first low frequency for driving the first sub-still image region;

and providing a second low frequency for driving the second sub-still image region.

16. The method of claim 15, wherein the first sub-still image region is disposed adjacent to the moving image region, and wherein the first low frequency is higher than the second low frequency.

17. The method of claim 16, wherein providing the power consumption required to drive the display panel is accomplished by:

providing a third power consumption required to drive the display panel when the still image region is driven at the first low frequency; and providing a fourth power consumption required to drive the display panel when the first sub-still image region is driven at the normal driving frequency, and when the second sub-still image region is driven at the second low frequency.

18. The method of claim 17, wherein determining the driving frequency of the first partial region and the driving frequency of the second partial region is accomplished by determining a driving frequency of the still image region by comparing the third power consumption and the fourth power consumption to each other.

19. The method of claim 18, wherein determining the driving frequency of the first partial region and the driving frequency of the second partial region is accomplished by determining the first low frequency as the driving frequency of the still image region when the third power consumption is less than or equal to the fourth power consumption.

20. The method of claim 18, wherein determining the driving frequency of the first partial region and the driving frequency of the second partial region is accomplished by determining the normal driving frequency as a driving frequency of the first sub-still image region when the third power consumption is greater than the fourth power consumption, and determining the second low frequency as a driving frequency of the second sub-still image region when the third power consumption is greater than the fourth power consumption.

* * * * *